(No Model.)  2 Sheets—Sheet 1.
J. M. FULTON.
AUTOMATIC GRAIN MEASURE, REGISTER, AND SACKER.
No. 294,459.  Patented Mar. 4, 1884.
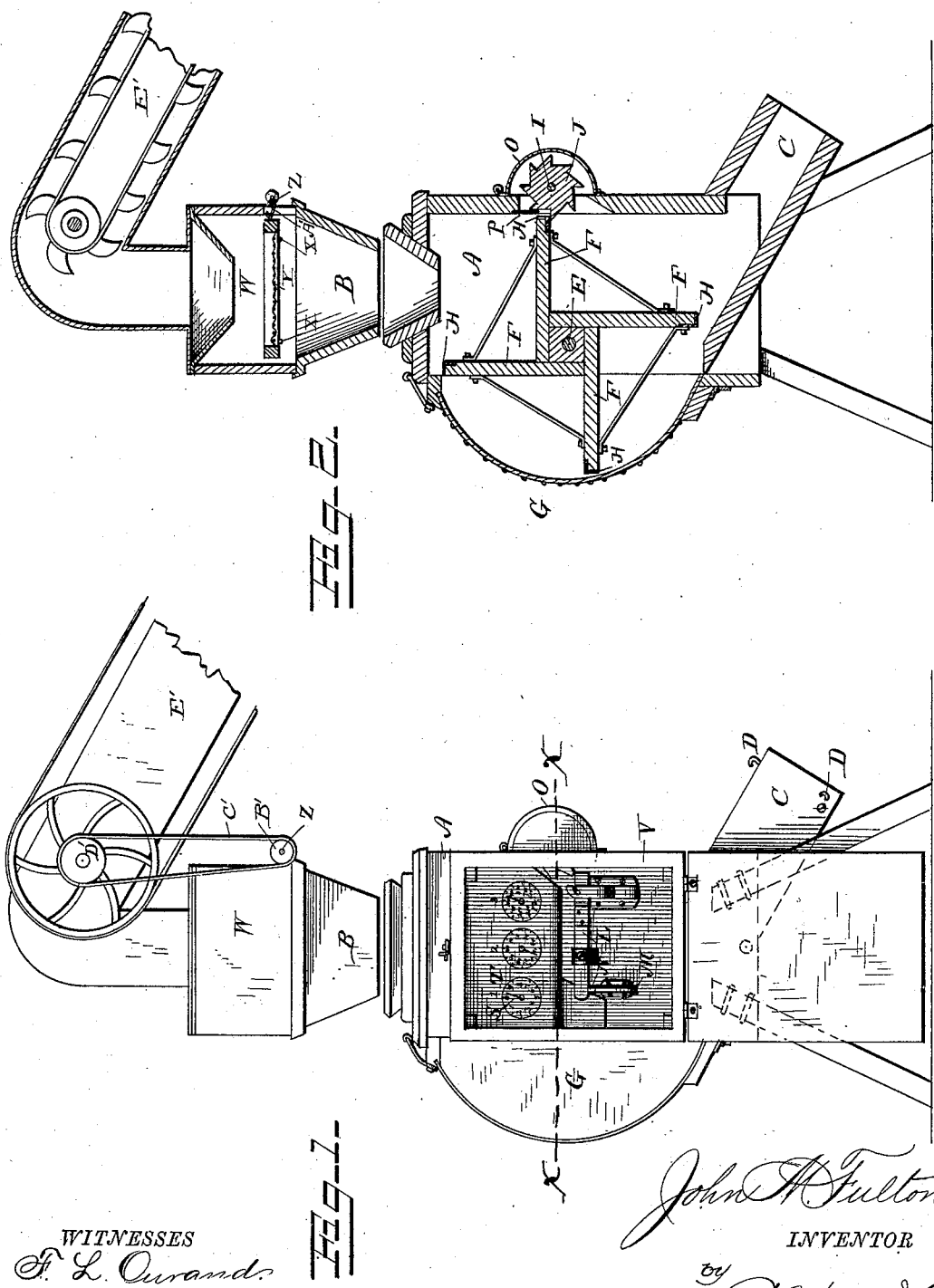
WITNESSES
F. L. Ourand
J. Reed Littell
INVENTOR
John M. Fulton
by C. A. Snow & Co.
Attorneys.

(No Model.) 2 Sheets—Sheet 2.
J. M. FULTON.
AUTOMATIC GRAIN MEASURE, REGISTER, AND SACKER.
No. 294,459. Patented Mar. 4, 1884.
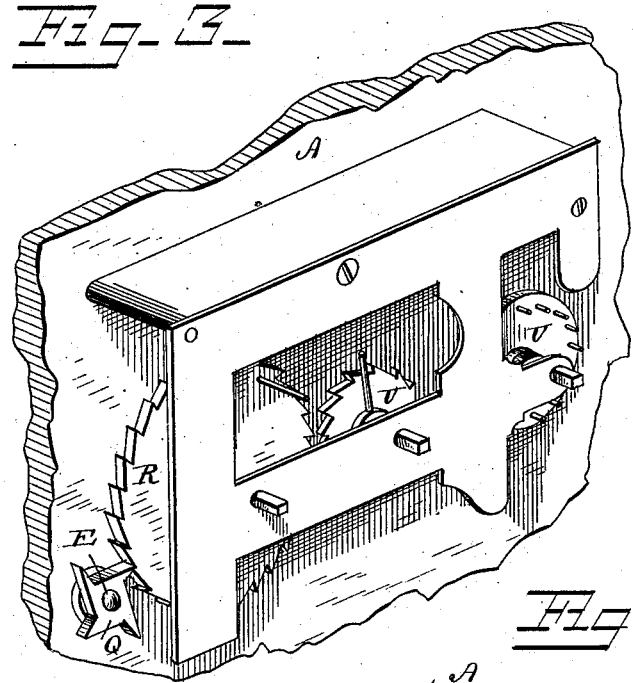
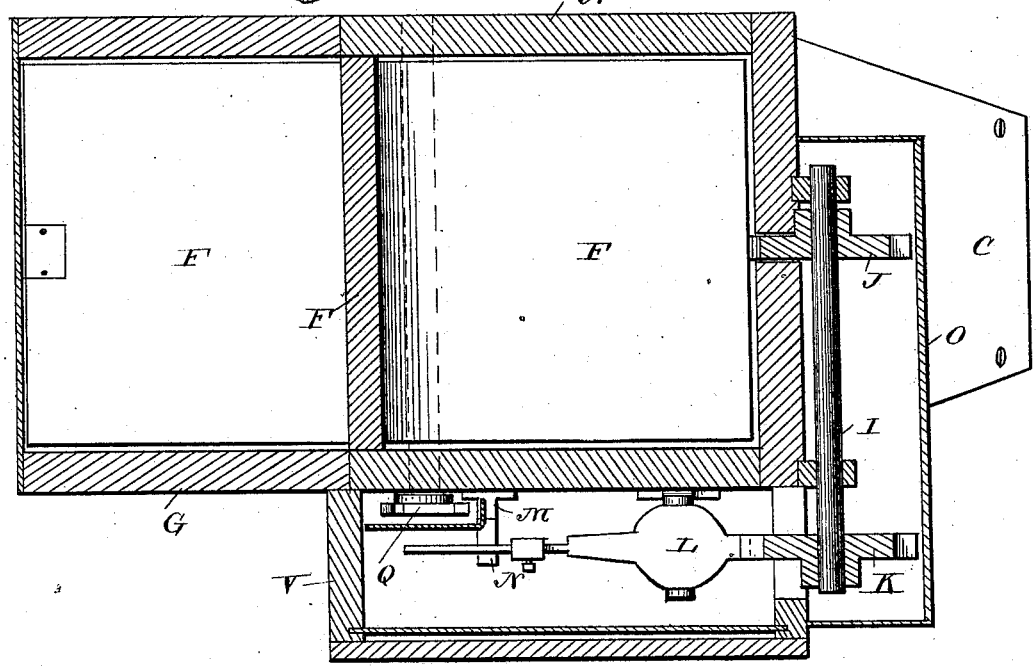
WITNESSES
INVENTOR
John M. Fulton,
by C. A. Snow & Co.
Attorneys.

United States Patent Office.

JOHN M. FULTON, OF ROANOKE, INDIANA.

AUTOMATIC GRAIN MEASURE, REGISTER, AND SACKER.

SPECIFICATION forming part of Letters Patent No. 294,459, dated March 4, 1884.

Application filed May 23, 1883. (No model.)

*To all whom it may concern:*

Be it known that I, JOHN M. FULTON, a citizen of the United States, residing at Roanoke, in the county of Huntington and State of Indiana, have invented a new and useful machine—to wit, an Automatic Grain Measure, Register, and Sacker—of which the following is a specification, reference being had to the accompanying drawings.

This invention relates to machines for weighing, registering, and sacking grain; and it has for its object to provide a machine which shall be simple and durable in its construction, and by which the several operations referred to shall be performed in the most efficient manner and without manual attendance, all as will be hereinafter fully described, and particularly pointed out in the claims.

In the drawings hereto annexed, Figure 1 is a side view, the front casing being open, so as to expose the tallying mechanism. Fig. 2 is a vertical sectional view. Fig. 3 is a detail view, in perspective, of the tallying mechanism; and Fig. 4 is a horizontal sectional view on the line *x x* in Fig. 1.

The same letters refer to the same parts in all the figures.

A in the drawings hereto annexed designates a suitable casing, having at its upper end a hopper, B, for the admission of the grain to be weighed, and at its lower end a chute, C, through which the grain escapes after being weighed. Said chute is provided with hooks D, or other suitable means for retaining in position the bag which is to receive the grain.

Mounted transversely in the frame or casing A is a horizontal shaft, E, having a series of four wings or paddles, F, of such length as to extend to the front side of the casing, the shaft E being journaled near the rear side of the same. The rear end of the casing has a bulging door, G, to permit the paddle-shaft to revolve, and to furnish access to the same when necessary. The wings or paddles are fitted nicely between the sides of the casing, and their edges are provided with thin flexible packing-strips H, of soft leather or rubber, which serve to keep the joints between the wings and the sides of the casing tight at all times, despite possible shrinkage of the wings and casing. A temporary floor for the casing A is formed by the wing which at the time occupies a horizontal position, extending forwardly from the shaft to which it is attached.

Journaled in suitable brackets or bearings at the front side of the casing is a horizontal shaft, I, having a ratchet-wheel, J, which extends through a slot in the front side of the casing, so that one of the teeth or ratchets shall always project into the said casing and support in a horizontal position the wing which at the time forms the bottom of the casing. At its outer end the shaft I has another correspondingly-toothed ratchet-wheel, K, one of the teeth of which rests against the short end of a scale-beam, L, the long arm of which is supported upon a bracket, M, having a cushion, N. The scale-beam is so weighted or adjusted that a pressure of, say, thirty pounds (the weight of one-half bushel of wheat) upon the temporary floor will overbalance the beam, tilt the floor so as to cause the contents of the casing to escape through the chute, and revolve the shaft I the space of one notch upon its ratchet-wheels, thereby causing the machine to be automatically reset, as before. The shaft I, with its attachments, is protected by a hinged hood, O, and the slot in the front of the casing, through which the ratchet-wheel J extends into the same, is provided with a suitable packing, P, which prevents the grain from escaping.

One end of the shaft E projects through the side of the casing A, and is provided with a four-pronged wheel, Q, arranged to engage a ratchet-wheel, R, having twenty teeth or ratchets. It will thus be seen that each revolution of the wheel R will indicate the passage of twenty half-bushels or ten bushels of grain through the machine. The outer end of the arbor of wheel R carries a hand or index, S, which indicates upon a suitable dial, T, the units of bushels that have passed through the machine. The wheel R is arranged to operate a train of wheels, U, the arbors of which have hands that indicate the tens and hundreds of bushels. A suitable hinged casing, V, having a transparent front panel, serves to protect the indicating or registering mechanism.

The operation of my invention will be readily understood from the foregoing description, taken in connection with the drawings hereto annexed. It may be used separately for measuring grain in mills or elevators, or it may be attached to and operated in connection with a thrashing-machine, in which case a suitably-arranged elevator is to be employed to convey the grain to the hopper at the top of the casing. The construction is simple and inexpensive, and the machine will automatically and accurately weigh, register, and bag the grain which may be passed through it.

I claim as my invention and desire to secure by Letters Patent of the United States—

1. The combination of the casing having a hopper at its upper end and an inclined chute at its lower end, the four-winged wheel or paddle journaled in the rear part of the said casing, the horizontal shaft having a centrally-located ratchet-wheel adapted to support one of the wings which forms a temporary floor of the casing, a correspondingly-toothed ratchet-wheel at the outer end of the said shaft, and a suitably-poised scale-beam arranged to act as a detent against the said outer ratchet-wheel, substantially as set forth.

2. The combination of the casing, the revolving four-winged wheel or paddle, a horizontal shaft having a ratchet-wheel arranged to support the wing which forms at the time a temporary floor of the casing, a correspondingly-toothed ratchet-wheel at the outer end of said shaft, a suitably-poised scale-beam arranged to act as a detent against the said outer ratchet-wheel, a wheel at the outer end of the paddle-shaft, and a registering mechanism arranged to be actuated by the said sprocket-wheel, as set forth.

3. The combination, with the casing having the revolving paddle-wheel, the shaft of which is journaled in the rear part of the said casing, of the hinged bulging door which provides room for the said paddle-wheel to revolve, and affords access to the same, substantially as and for the purpose set forth.

In testimony that I claim the foregoing as my own I have hereto affixed my signature in presence of two witnesses.

JOHN M. FULTON.

Witnesses:
LEVI MOCK,
JOSEPH S. DAILEY.